J. E. BATCHELDER.
AUTOMATIC DIRIGIBLE HEADLIGHT FOR MOTOR VEHICLES.
APPLICATION FILED NOV. 25, 1916.
1,270,363.
Patented June 25, 1918.
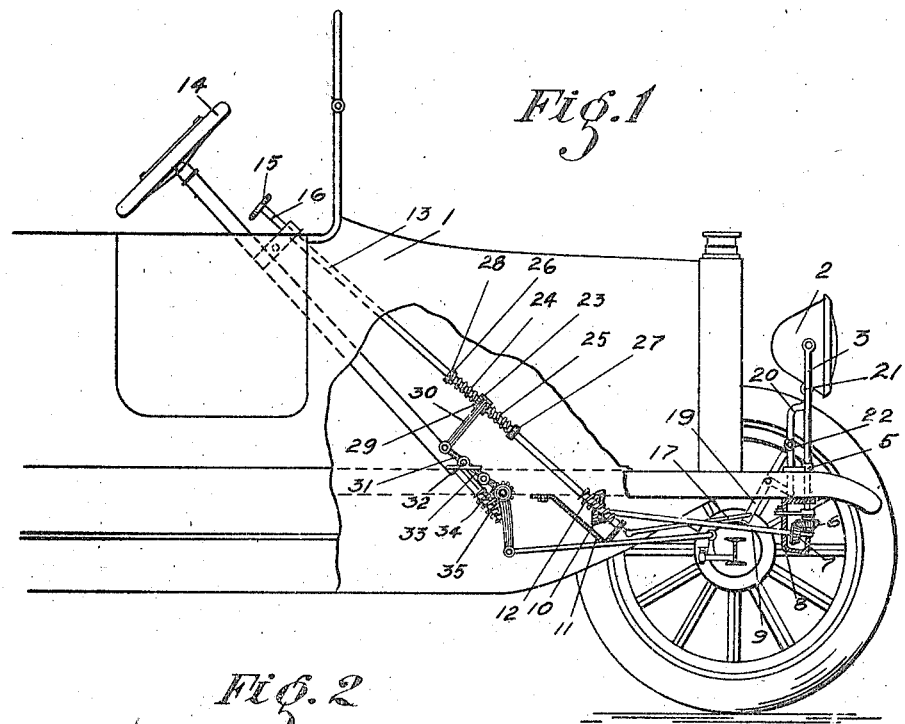
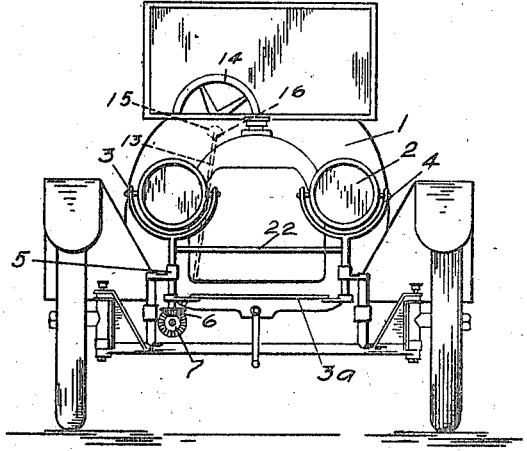
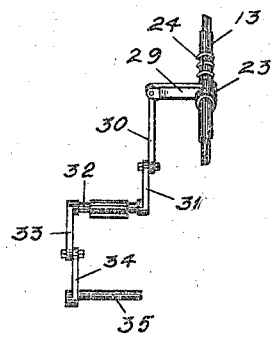
WITNESS
Bernard Privat
INVENTOR.
J. E. Batchelder
BY
ATTORNEY

UNITED STATES PATENT OFFICE.

JOHN EKIN BATCHELDER, OF JACKSON, CALIFORNIA.

AUTOMATIC DIRIGIBLE HEADLIGHT FOR MOTOR-VEHICLES.

1,270,363.

Specification of Letters Patent.

Patented June 25, 1918.

Application filed November 25, 1916. Serial No. 133,466.

*To all whom it may concern:*

Be it known that I, JOHN E. BATCHELDER, a citizen of the United States, residing at Jackson, in the county of Amador, State of California, have invented certain new and useful Improvements in Automatic Dirigible Head-Lights for Motor-Vehicles; and I do declare the following to be a full, clear, and exact description of the same, reference being had to the accompanying drawings, and to the characters of reference marked thereon, which form a part of this application.

This invention relates to improvements in head-lights mounted on motor vehicles whereby the same may be made dirigible for turning in such direction as the vehicle may be turned, this being accomplished by connection with the steering mechanism of the vehicle and in addition to this I provide a manual operating means operable at or near the steering wheel of the vehicle whereby the lamps may be turned in either direction or up and down as may be required. Traveling at night especially in mountainous country is very dangerous with the ordinary form of head-lights due to the fact that in cresting a hill they throw off into space instead of down upon the road and the road often turns and twists and drops off at an angle just at the crest of a hill which renders it extremely dangerous in manipulation of the vehicle where the road cannot be seen with the lights. Also in twisting around winding roads the lights are of very little benefit when rigidly attached to the vehicle.

It is these conditions which my improved dirigible attachment is designed to overcome.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a side elevation of a motor vehicle partly broken away showing my improved attachment for the lights.

Fig. 2 is a front elevation of the vehicle showing such attachment in operative position.

Fig. 3 is a fragmentary view showing the connecting means between the steering arm and headlight mechanism.

Referring now more particularly to the characters of reference on the drawings the numeral 1 designates the vehicle and 2 the head-lights thereon which in my improved structure are supported upon rods 3 and 4 which are turnable through brackets 5 suitably mounted on the frame of the vehicle. At the lower end of one of the rods 3 or 4 is a small beveled gear 6 which intermeshes with another beveled gear 7 held in a bracket 8.

Connected with the gear 7 is a projecting rod 9 which terminates in a small pinion 10 suitably journaled in any desired form of bracket, as at 11.

Intermeshing with the pinion 10 is a worm or similar gear 12 connected on the end of a hollow rod 13. This hollow rod 13 extends upwardly to a point adjacent the steering wheel 14 of the vehicle and is journaled in suitable supports to allow of its being freely turnable.

The numeral 15 designates the operating handle which has a shank 16 slidable longitudinally within the member 13 but being turnable therewith.

A small stiff rod 17 is connected with the handle 15 by a ball and socket joint and projects through the tubular member 13 and thence is guided through supporting roller bearings at the end of the tubular member 13 and thence is connected with a bell crank 19 mounted on the frame of the vehicle adjacent the bracket 3. The opposite end of the bell crank 19 is connected with an operating arm 20 which in turn connects by a ball and socket joint 21 with one of the lamps 2.

A cross bar 22 connects the operating arm 20 with another similar arm on the other lamp 2 which latter arm in turn connects by a ball and socket joint with the other lamp. Thus with the operation of the bell crank 19 the lamps 2 may be turned to throw the light therefrom up or down, this being accomplished by pulling the handle member 15 up or down which causes the rod 17 to operate the bell crank 19.

The above described mechanism shows how the lights may be tilted up and down at the will of the operator.

The lights also turn automatically as the vehicle is turned by means of the following described mechanism, namely:

A loose sleeve 23 about three inches long is fitted over the tubular rod 13 at a convenient point beneath the hood or body of the vehicle.

Rigidly connected with each end of this sleeve 23 are spiral springs 24 and 25, the opposite ends of each of these springs 24 and 25 being fastened to small adjusting collars 26 and 27 respectively. These adjusting collars 26 and 27 are in turn fastened to the tubular member 13 by means of set screws 28 whereby by moving the collars at different points the tension of the springs 24 and 25 may be properly adjusted. The sleeve 23 is provided with a projecting arm 29.

A connecting rod 30 leads from the arm 29 to another rod 31 and thence to a rocking shaft 32. The rocking shaft 32 is provided with another arm 33 on the opposite end which in turn is connected with an arm 34 on the steering gear shaft 35.

When the wheels are steered in one direction or the other the shaft 35 turns and this, through the medium of the connection shown, turns the sleeve 23. The springs 24 and 25 are at such tension that this turns the tubular member 13.

This action causes the gear 12 to turn the gear 10 and incidentally the shaft 9 and gear 7, and hence the gear 6. This will turn the bracket 3 and the corresponding light 2 and since a cross rod 3ᵃ connects the brackets 3 and 4 this will likewise turn the other lamp 2 in the same direction as the vehicle is turned. If this turning operation is not sufficient to satisfy the needs of the operator of the car, he reaches forward and grasps the handle 15 and turns the lamps further, the springs 24 and 25 allowing of this action.

From the foregoing description it readily appears that I have produced a dirigible headlight which is automatic in its operation under normal conditions, and which can be manually operated to suit the conditions which may arise in the driving of the vehicle.

Also from the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention as defined by the appended claim.

Having thus described my invention what I claim as new and useful and desire to secure by Letters Patent is:

The combination with headlights of a vehicle swiveled for lateral movement, of a means for operating the same both manually and automatically, such means comprising an operating rod arranged to be turned by hand to move the lights laterally at will, and means connected between the steering mechanism and such rod for turning the same when the vehicle is steered in one direction or the other, such means comprising a sleeve on the rod, spiral springs connected with the sleeve and with the rod, and means interposed between the sleeve and steering mechanism whereby when the steering mechanism is operated the sleeve will be turned.

In testimony whereof I affix my signature.

JOHN EKIN BATCHELDER.